United States Patent
Bowles et al.

[19]

[11] Patent Number: 5,826,918
[45] Date of Patent: Oct. 27, 1998

[54] FUEL TANK CONNECTOR

[75] Inventors: David T. Bowles, Bicknacre; Ronald P. Pardy, Tiptree, both of United Kingdom

[73] Assignee: Ford Global Technologies, Inc., Dearborn, Mich.

[21] Appl. No.: 780,891

[22] Filed: Jan. 9, 1997

[51] Int. Cl.⁶ .................................................. F16L 37/26
[52] U.S. Cl. ........................ 285/24; 285/319; 285/136.1
[58] Field of Search ................................. 285/24, 27, 38, 285/136.1, 238, 239, 307, 319, 921, 379

[56] References Cited

U.S. PATENT DOCUMENTS

| | | | |
|---|---|---|---|
| 1,947,593 | 2/1934 | Hamilton | 285/379 X |
| 5,318,332 | 6/1994 | Hohmann et al. | 285/24 |
| 5,568,946 | 10/1996 | Jackowski | 285/38 |
| 5,577,775 | 11/1996 | Pearson et al. | 285/24 |
| 5,626,371 | 5/1997 | Bartholomew | 285/319 |

FOREIGN PATENT DOCUMENTS

| | | | |
|---|---|---|---|
| 504498 | 4/1939 | United Kingdom . | |
| 2116274 | 9/1983 | United Kingdom | 285/27 |
| 2200421 | 1/1988 | United Kingdom . | |
| 2259342 | 7/1992 | United Kingdom . | |

*Primary Examiner*—Dave W. Arola
*Assistant Examiner*—Gary Grafel
*Attorney, Agent, or Firm*—Neil P. Ferraro

[57] ABSTRACT

The invention relates to a connector for connecting a fuel filler pipe (3) to a fuel tank (1), particularly in a motor vehicle. The connector has a tubular sealing housing (2) attached to the fuel tank (1) and a retention collar (4) retained by a pair of flanges (7,8) on the pipe (3) and which may be press-fitted to the housing (2). The collar (4) has a ring (5) from which four lugs (6) extend axially towards the housing (2). Each lug (6) has: a radially outward projecting detent (13) which engages with a lip (39) within the housing (2); and a radially inward projecting detent (14) which retains the filler pipe (3) in one axial direction, the filler pipe (3) being retained in the other axial direction by the ring (5). The housing (2) has a grommet (60) seal with the filler pipe (3) and also a number of crenellations (9,10,11) and detent guide channels (38) which receive and guide outwardly projecting detents (13) to the lips (39).

15 Claims, 3 Drawing Sheets

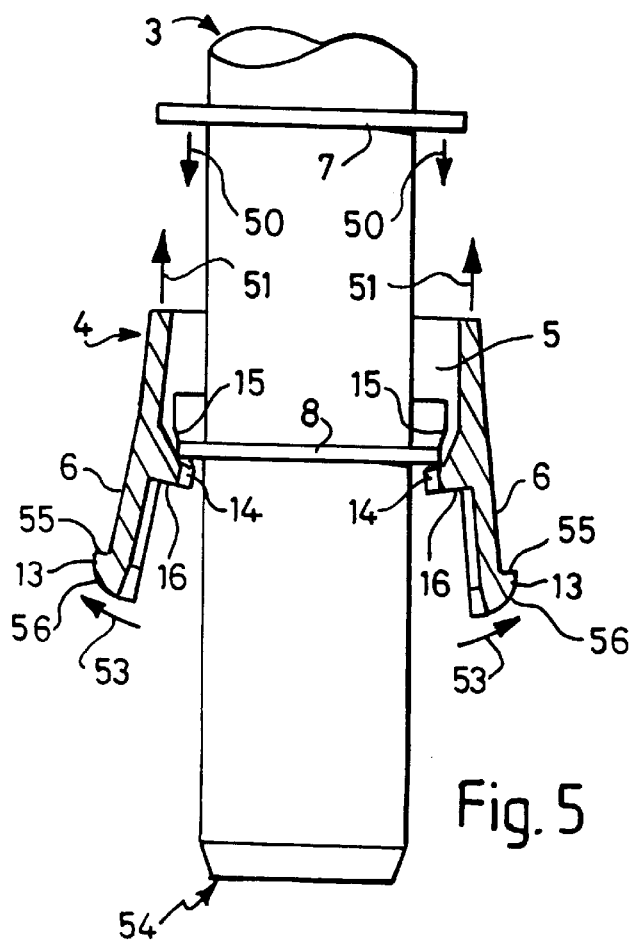
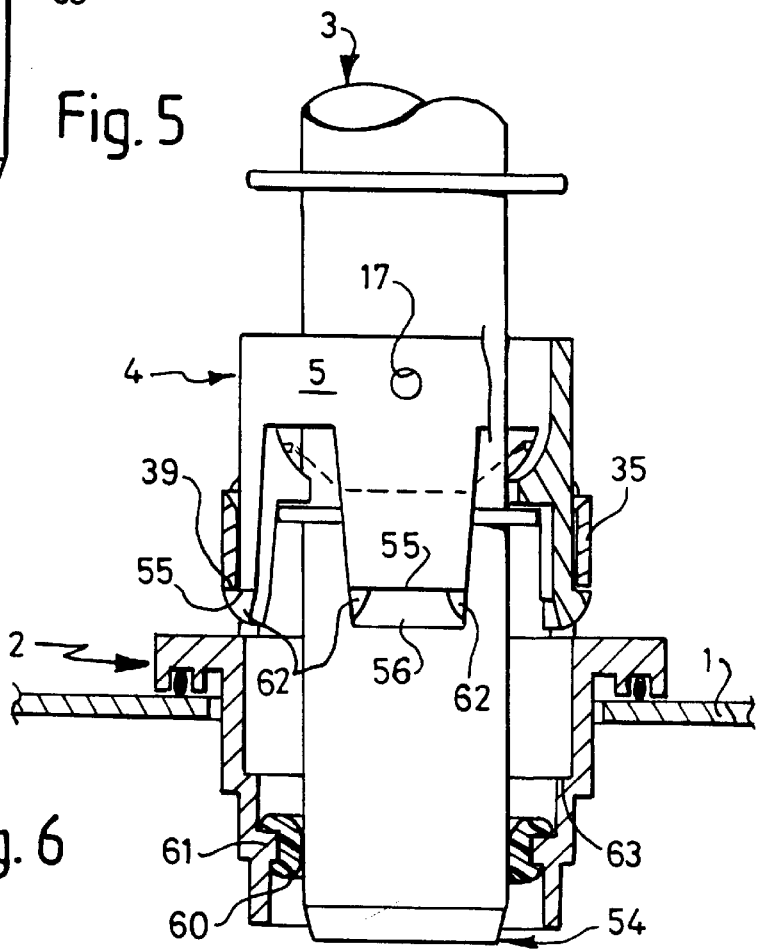

FUEL TANK CONNECTOR

FIELD OF THE INVENTION

The invention relates to a connector for connecting a fuel filler pipe to a fuel tank, particularly in a motor vehicle. The connector is of a quick connecting type for ease of mounting and preferably also of a quick release type.

FIELD OF THE INVENTION

It is conventional for a fuel tank and an associated fuel filler pipe to be manufactured separately and to be connected to one another during assembly of the motor vehicle. The connection of the pipe to the tank should therefore be easy to make, yet should satisfactorily seal and should also be resistant to separation forces (preferably up to at least 2.67 kN) which may occur, for example, in the event of a crash.

It is known to provide an annular sealing grommet at the tank inlet opening and to push-fit the end of a round pipe through the grommet to form a seal. It is conventional to machine the end of the filler pipe to produce a true cylindrical wall which will seal with the grommet. However such an assembly has very little resistance to separation loads, although it is intended that some sliding movement between the filler pipe and the grommet should be allowed without adversely affecting the performance of the seal.

It is also known to provide a press-fit connector to provide a more secure engagement between a fuel filler pipe and a fuel tank. One such connector is described in patent document U.S. Pat. No. 4,601,497 which discloses in a FIG. 15 a retainer element which is press-fitted onto a tubular conduit and which is then press fitted into a housing. The connector may be disengaged by pressing radially inwards on exposed finger portions or lugs. Although such a release mechanism is convenient, such exposed lugs may inadvertently be released. Furthermore, this connector does not allow relative axial movement between the pipe and the connector after fitting to the housing.

SUMMARY OF THE INVENTION

It is an object of the present invention to provide a fuel tank connector and a fuel tank assembly that overcomes some of these limitations.

According to the present invention there is provided a connector for connecting a fuel filler pipe to a fuel tank, the connector comprising a generally tubular sealing housing for attachment to a fuel tank and a retention collar for engagement with the housing and for retention of the filler pipe, the housing having a passage therethrough with sealing means for making a seal with the filler pipe and the collar having engagement means for engaging with an engagement feature of the housing and having retention means for retaining a filler pipe having a retention feature, characterised in that the housing has a number of guide channels therein for receiving the engagement means and guiding the engagement means to the engagement feature, in which the collar may be engaged with the housing by relative axial movement in a one-way press-fit engagement.

The engagement feature may comprise a lip, preferably within the housing, and the collar may be formed as a ring having a number of lugs spaced around its circumference and extending axially therefrom. The engagement means may then comprise on at least some of the lugs a radially outward projecting detent having an engagement surface for axial engagement with the lip. Then, during the one-way press-fit engagement, the lugs may flex inwardly as the outwardly projecting detents are pressed into the guide channels towards the lips until the engagement surfaces reach and snap into engagement with the lips.

Preferably, the retention means comprises on at least some of the lugs a radially inward projecting detent having a retention surface for axial retention with the filler pipe retention feature. These detents may advantageously have a ramp section adapted to slide over a radially outward projecting filler pipe retention feature so the collar may be fitted to the filler pipe by relative axial movement during which the lugs flex outwardly as the ramp sections of the inwardly projecting detents are pressed over the filler pipe retention feature until the retention surfaces reach and snap into retention with the filler pipe retention feature.

Since the filler pipe may optimally have a circular cross section, the connector will most preferably also have a circular symmetry about an axis through the center of the filler pipe.

In a preferred embodiment each lug, of which there may be four, has both the inwardly and the outwardly projecting detents. Although the lugs are generally parallel to an axis through the ring and connector, prior to engagement of the collar within the housing each lug may tend to have a slight outwards taper as it extends away from the ring of the retention collar. Then, when the collar is engaged within the housing, this natural outward taper of the lugs will bias or tension the lugs radially outwards to keep the engagement surfaces engaged with the lips.

The guide channels may have entrances formed from crenellations around the end of the generally tubular housing. The bases and sides of the crenellations may be aligned with the guide channels so that the tops are aligned between the guide channels.

In order to help guide each lug into the entrance at the base of a crenellation, the sides of each crenellation may taper apart away from the entrance to the guide channel. The crenellations may also be chamfered to receive the outwardly projecting detents so that the detents flex inwards and are received by the guide channels as the lugs are pressed into the guide channels.

Once the collar is engaged within the housing, axial rotation of the collar with respect to the housing may be limited by a stop feature within the housing which engages with a portion of a lug. For example, one or more of the lips may terminate in an edge which is adapted to contact an edge of the engagement surface at the side of an outwardly projecting detent, in order to limit axial rotation of the collar.

The lip may be provided as one surface in a recess, preferably a rectangular recess, in the inner wall of the housing. Another surface in the recess may form the edge to the lip, such as a surface at right angles to the lip, to act as the stop feature which contacts the side of the outwardly projecting detent.

It is preferred if the edge of the lip and/or the edge of the engagement surface is/are chamfered so that upon application of a sufficient torque the collar may be readily rotated with respect to the housing so that the edge of the engagement surface rides up over the edge of the lip and so disengages the engagement surface from the lip, whereupon the collar may be disengaged from the housing.

The collar may advantageously be provided with a grip feature to facilitate the application of the sufficient torque to remove the outwardly projecting detents from the recesses. These grip features may be studs or drive dogs projecting from the ring portion of the collar, or the collar may have a hexagonal external profile for engagement by a wrench.

In addition or as an alternative to disengagement by the application of the sufficient torque, the housing may have apertures therethrough giving access to the lugs and preferably in proximity with the lips to give access to the detents, so that the disengagement of an engagement surface from a lip may be facilitated by pressing a lug, or equivalently an outwardly projecting detent, radially inwards through an aperture.

The housing and/or the collar is/are advantageously made from a moulded plastics material, preferably high density polyethylene or even more preferably acetal plastic, or a combination of the two.

The sealing means may have an annular shoulder in the passage through the housing which supports a grommet for making the seal with the filler pipe, which may then have an end region which fits within the housing to make a seal with the grommet. The housing may also have a second annular shoulder in the passage to protect the grommet by preventing the lugs from penetrating as far as the grommet.

Also according to the invention, there is provided a fuel tank assembly for a motor vehicle, comprising a fuel tank with an inlet opening, a filler pipe, and a connector which is sealed to the tank around the inlet opening and which connects the filler pipe to the tank through the inlet opening, in which the connector comprises a generally tubular sealing housing for attachment to the fuel tank and a retention collar for engagement with the housing and for retention of the filler pipe, the housing having a passage therethrough with sealing means for making a seal with the filler pipe and the collar having engagement means for engaging with an engagement feature of the housing and having retention means for retaining a filler pipe having a retention feature, characterised in that the housing has a number of guide channels therein for receiving the engagement means and guiding the engagement means to the engagement feature, in which the collar may be engaged with the housing by relative axial movement in a one-way press-fit engagement.

The filler pipe retention feature preferably has a first external annular retention flange or ridge for engagement with the retention means to limit relative axial movement between the filler pipe and the collar in one axial direction. The filler pipe retention feature may also have a second external annular retention flange or ridge for engagement with the retention means to limit relative axial movement between the filler pipe and the collar in the other axial direction. The retention ridges may then be spaced so that the filler pipe may move axially relative to the connector between limits defined by contact between one or the other of the retention ridges and the retention means. Such a movement may, for example, be required owing to manufacturing tolerances in assembly of the fuel tank assembly with a motor vehicle in which the end of the filler pipe is affixed to the body shell of the vehicle. Relative movement may also occur during an accident. The sealing means and the filler pipe then must be arranged so that the sealing means maintains the seal with the filler pipe as the filler pipe moves axially between the limits.

DESCRIPTION OF THE DRAWINGS

The invention will now be described further by way of example with reference to the accompanying drawings, in which:

FIG. 5 is a side view of the fuel filler pipe and cross-section of the collar of FIG. 1, showing the collar during engagement with the fuel filler pipe; and FIG. 6 is a view of the housing of FIG. 3 with the fuel filler pipe and collar engaged within the housing, the collar shown cut away and in partial cross-section.

DETAILED DESCRIPTION OF THE PREFERRED EMBODIMENT

Figure 1:
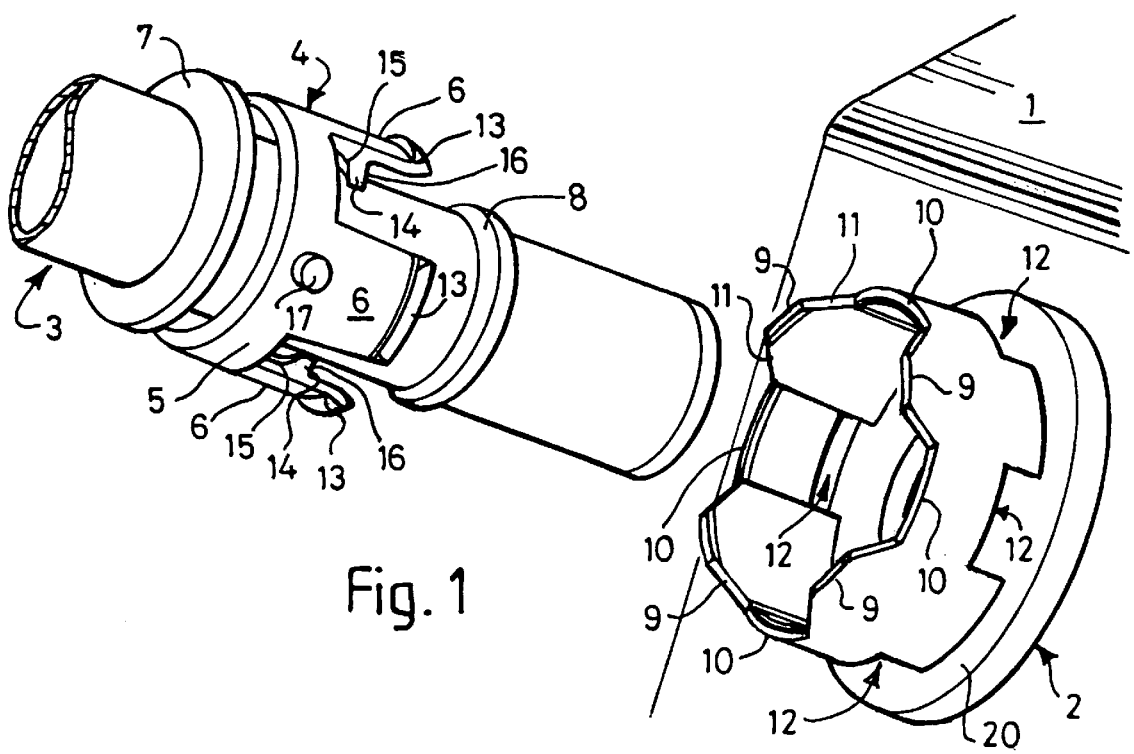
FIG. 1 is a perspective view of a fuel tank connector according to the invention, comprising a collar retained on a fuel filler pipe and a housing attached to a fuel tank.
Figure 2:
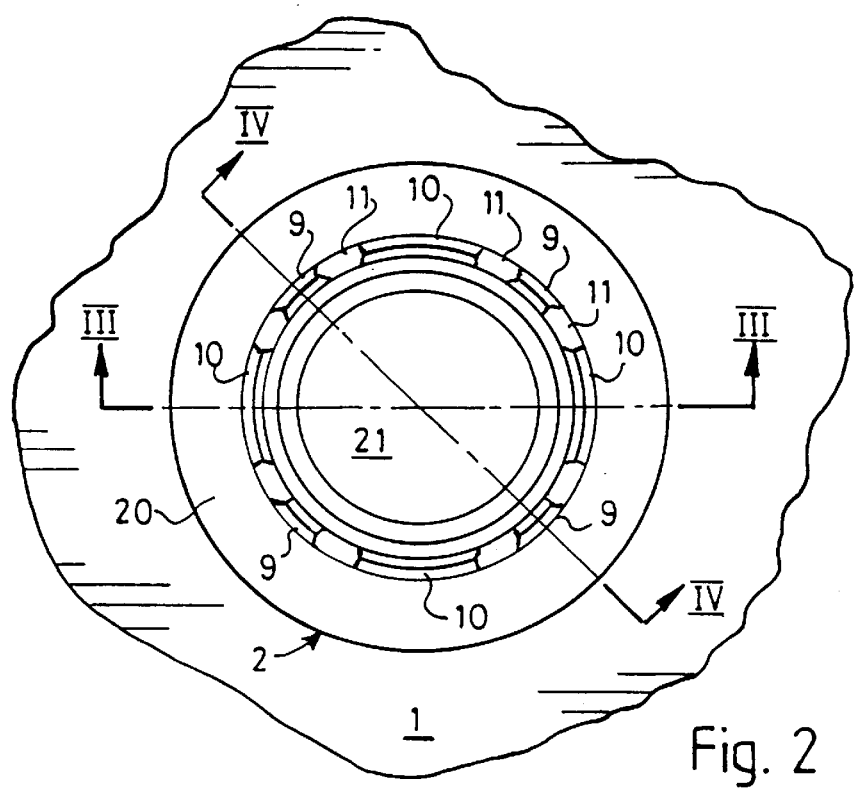
FIG. 2 is a top view of the housing of FIG. 1.

FIGS. 1 and 2 show part of a fuel tank 1 which is moulded from high density polyethylene or acetal plastic. The tank has a generally tubular sealing housing 2, which is also a plastics moulding, mounted on the external wall of the tank around an inlet opening 21. The housing has an annular flange 20 which is hot plate welded to the wall of the tank 1 around the periphery of the opening 21.

A fuel filler pipe 3 is to be connected to the tank 1. Only one end of the pipe 3 is shown in FIG. 1. The other end will be accessible from the exterior of the vehicle so that a filler nozzle can be inserted. The pipe may be made from tubular steel, or from a blow-moulded plastic.

A moulded plastic retention collar 4 is fitted to the pipe 3, which is shown prior to engagement of the collar 4 with the housing 2 and ready for insertion into the housing 2.

The collar has a ring portion 5 around which are equidistantly spaced four lugs 6. The collar also has on opposite sides of the ring and aligned with the lugs a pair of drive dogs 17 in the form of cylindrical studs.

Three of the lugs 6 and one of the drive dogs 17 are visible in the drawing; the fourth lug and second drive dog 17 are hidden from view by the pipe 3. The lugs 6 extend generally along the axial direction of the pipe towards the housing. Each lug has an outwardly projecting detent 13 at its free end and an inwardly projecting detent 14 about half way between the end of the lug and collar ring 5.

The collar 4 is retained from sliding beyond limits defined by two parallel flanges or ridges 7,8 on the pipe 3, which together form a filler pipe retention feature.

Figure 3:
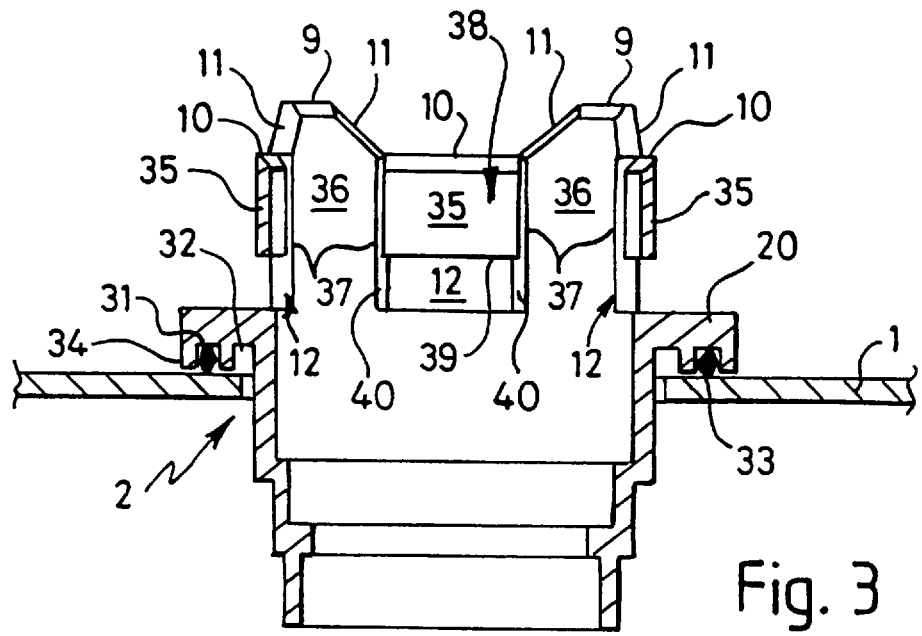
FIG. 3 is a side view cross-section of the housing taken along line III—III of FIG. 2.
Figure 4:
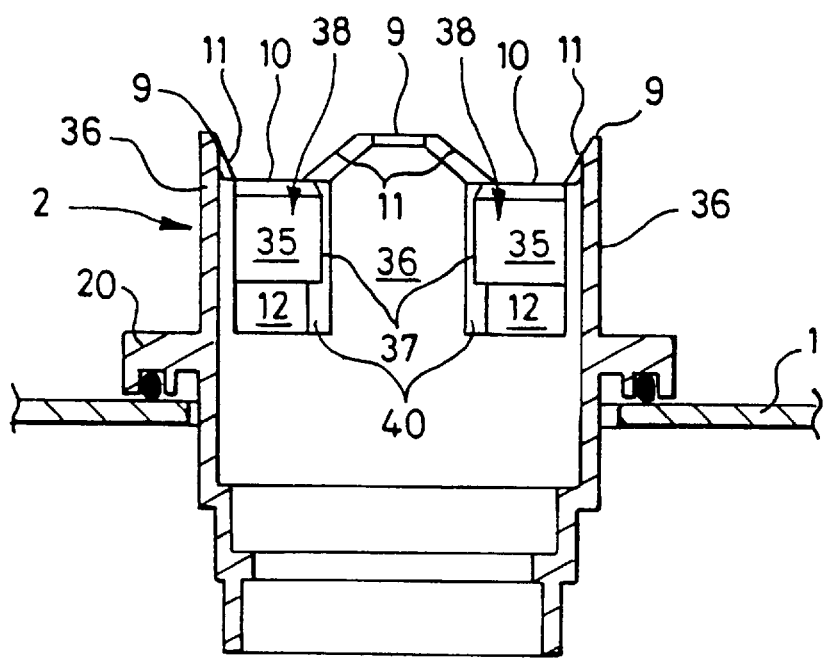
FIG. 4 is a side view cross-section of the housing taken along line IV—IV of FIG. 2.

Referring now also to FIGS. 3 and 4, the housing flange 20 has two concentric annular grooves 31,32 which open towards the tank. The outer groove 31 holds a rubber o-ring 33. The housing is welded to the tank around the outer periphery 34 of the housing flange 20, and the o-ring helps to prevent fuel from reaching this weld.

The housing has a crenellated rim with four tops 9 and four bases 10 which, prior to engagement of the pipe to the tank face towards the four collar lugs 6. The extent of the crenellation tops around the periphery of the housing is about one-third that of the extent of the crenellation bases. On either side of each base 10 are crenellation sides 11 which taper outwards towards the adjacent tops 9. Taken together, the peripheral extent of the sides and tops is about the same as that of the bases.

The crenellation tops 9, bases 10 and sides 11 are all chamfered along the inner edge of the housing rim.

Directly below each of the four crenellation bases 10 is a rectangular aperture 12 through the wall of the tubular housing 2. The width of the aperture is the same as the length of the crenellation base 10, with the lower edge of the aperture being coincident with the top surface of the housing flange 20. The height of the aperture 12 is about one-quarter the aperture width. The housing wall has a thin portion 35 between each aperture 12 and crenellation base 10, with thicker portions 36 between the thinner portions 35. There is a step change in the thickness of the housing wall between the thin and thick portions. The thinner portions therefore form channels 38 bounded by straight parallel channel edges 37 at the step change in wall thickness, and these channels are aligned directly between the points where the crenellation bases and sides meet.

The upper edge of each aperture 12 at the end of the channel 38 forms a flat lip 39. The ends of the aperture 12 therefore form edges 40 to the lips.

Returning now to the description of the pipe 3 and retention collar 4, FIG. 5 shows how the collar is assembled with the pipe. As indicated by the opposing arrows marked 50 and 51 in the drawing, the free end 54 of the pipe 3 is first inserted through the collar ring 5 until the four inwardly projecting detents 14 come up against the first ridge 8 on the pipe. Each inwardly projecting detent 14 has a gently curved ramp section 15 on one side, and on the other side a retaining surface 16 which extends at right angles to the length of the lug. The ramps 15 allow the detents 14 to ride up over the ridge 8 and so splay the lugs 6 outwards, as indicated by the arrows marked 53, until the retaining surfaces 16 snap into retention behind the first ridge 8. The collar is then retained from sliding off the free end 54 of the pipe.

The collar is retained in the other direction by the second ridge 7 on the pipe, since this ridge has a greater outer diameter than that of the collar ring 5, which in this example is 54 mm.

The ring 5 therefore retains the filler pipe in one axial direction, with the inwardly projecting detents 14 and retention surfaces 16 acting to retain the pipe in the other axial direction. The ring 5, detents 14 and retention surfaces 16 therefore act as retention means to retain the filler pipe 3 on the collar 4.

At this stage, the collar may be rotated freely on the pipe and may also translate freely along the pipe over a distance comparable with the length of the collar between the two ridges 7,8. The ridges may, of course, be spaced closer together than drawn in order to limit the movement of the collar 4 on the pipe 3, and hence the relative movement of the pipe 3 with respect to the housing 2. However, some degree of relative movement is desirable because there will in general be some permissible tolerance in the orientation and spacing between the tank and the filler pipe entrance (not shown) through which the tank is filled.

The final assembly of the pipe 3 to the tank 1 is shown in FIG. 6. As suggested by FIG. 1, the lugs 6 are roughly aligned with the crenellation bases 10, and the pipe is then inserted into the a passage through the housing 2 adapted to receive the pipe. The housing passage has sealing means in the form of a synthetic rubber grommet 60 which is seated on a first internal annular shoulder 61 towards the inner rim of the housing.

The housing passage also has second internal annular shoulder 63 located between first internal annular shoulder 61 and housing flange 20 for protecting gromet 60 by preventing lugs 6 from penetrating as far as the gromet 60. Furthermore, second annular shoulder 63 is such that the distance between free end 54 and second internal annular shoulder 63 is less than the largest size of curved portion 56 of the lugs. To aid insertion, the free end 54 of the pipe is chamfered. The pipe is also machined over a length extending between the chamfered end and the first ridge 8 to form a true cylindrical surface to make a good seal with the grommet 60. The chamfered end of the pipe in this example has an outer diameter of 30 mm tapering to an outer diameter of 35 mm for the main body of the pipe.

As the pipe is pushed into the housing, the lugs 6 will come into contact with the crenellations, and if the outwardly projecting detents 13 are not aligned exactly with the crenellation bases 10, the tapered crenellation sides 11 will rotate the collar 4 until the detents are aligned with the bases. The width of each lug tapers from the ring 5 towards the outwardly projecting detent so that the sides of each lug are not quite parallel. The width of the detents is therefore somewhat less than the width of the crenellation bases and this helps to ensure that the detents slide fully within the channels, and do not ride up over the channel edges 37.

The detents 13 have on the lower edge a curved lower surface 56 which cooperates with the chamfered inner edge of the crenellation bases 10 to aid insertion of the detents into the guide channels 38. On the upper edge, the detents 13 have an engagement surface 55 which extends at right angles to the length of the lug.

The lugs 6 are deflected inwards during insertion into the channels 38 until the detents 13 reach the apertures 12, at which point the lugs snap outwards to seat the engagement surfaces 55 with the lips 39. Because the lugs have a slight natural outward taper, the lugs remain stressed outwardly to keep the lugs pressed outward into the channels and so keep the detents engaged within the apertures. Once engaged, the pipe 3 remains engaged and may not be pulled away from the tank at any withdrawal force up to at least 2.67 kN.

The outwardly projecting detents 13 and engagement surfaces 55 therefore act as engagement means and the apertures 12 and the lips 39 therefore act as an engagement feature to keep the collar 4 engaged with the housing 2.

Once assembled, the inwardly projecting detents 14 rest lightly on the pipe surface with a small clearance gap. The pipe is therefore supported about two arcs, one at the grommet 60 and one at the inwardly projecting detents 14. This limits relative radial movement between the pipe and housing, and helps to maintain a good seal at the grommet.

The ends 62 of the curved lower surface 56 of each detent 13, at the edges at the engagement surface 55, are chamfered in order to aid disassembly of the pipe from the tank. The drive dogs 17 may be gripped by a suitable tool to rotate the collar and apply a torque sufficient to cause the chamfered ends or edges 62 of the detents to ride up over the lip edges 40 and so bend the lugs inwards until the detents 13 are free of the apertures 12 and supported by the thicker portions 36 of the housing walls. The pipe and collar may then be removed from the housing and tank by pulling the lugs clear of the housing.

In addition, or as an alternative, the detents may be pressed inwards by a suitable tool through the apertures to disengage the detent engagement surfaces 55 from the lips 39.

If the pipe is pressed sufficiently hard into the tank, the detents could ride over the lower edge of the aperture and become disengaged. The outwardly projecting drive dogs 17 prevent over-insertion of the collar into the housing. However, if the collar did not have drive dogs, then the housing also has a second annular shoulder 63 with an internal diameter sufficiently small to prevent the detents from being pressed as far as the grommet 60.

The arrangement described allows simple assembly of the filler pipe to the tank, and gives good retention of the pipe in the tank, even during the level of pull-out loads which may occur during a motor vehicle crash. The connection between the pipe and the tank can however easily be disassembled for service purposes or accident repair, for example if it becomes necessary for any reason to remove either the filler pipe or the tank from a motor vehicle.

While the best mode for carrying out the invention has been described in detail, those skilled in the art in which this invention relates will recognized various alternatives and embodiments, including those mentioned above, in practicing the invention that has been defined by the following claims.

We claim:

1. A connector for connecting a fuel filler pipe (3) to a fuel tank (1), the connector comprising a generally tubular sealing housing (2) for attachment to a fuel tank (1) and a retention collar (4) for engagement with the housing (2) and for retention of the filler pipe (3), the housing (2) having a passage therethrough with sealing means (60,61) for making a seal with the filler pipe (3) and the collar (4) having engagement means (13,55) for engaging with an engagement feature (12,39) of the housing (2) and having retention means (5,14,16) for retaining a filler pipe (3) having a retention feature (7,8), with the housing (2) having a number of guide channels (38) therein for receiving the engagement means (13,55) and guiding the engagement means (13,55) to the engagement feature (12,39) wherein the collar (4) may be engaged with the housing (2) by relative axial movement in a one-way press-fit engagement, said guide channels (38) having entrances formed from crenellations (9,10,11) around the end of the generally tubular housing (2), the crenellations having bases (10) and sides (11), which are aligned with the guide channels (38), and tops (9), which are aligned between the guide channels (38).

2. A connector as claimed in claim 1, wherein the sides (11) of each crenellation taper apart away from the entrance to the guide channel (38).

3. A connector as claimed in claim 1, wherein the engagement feature has a lip (39) and the collar (4) has a ring (5) having a number of lugs (6) around its circumference and extending axially therefrom and the engagement means comprises on at least some of the lugs (6) a radially outward projecting detent (13) having an engagement surface (55) for axial engagement with the lip (39).

4. A connector as claimed in claim 3, wherein the crenellations (9,10,11) are chamfered to receive the outwardly projecting detents (13).

5. A connector as claimed in claim 3, wherein during the one-way press-fit engagement the lugs (6) flex inwardly as the outwardly projecting detents (13) are pressed into the guide channels (38) towards the lips (39) until the engagement surfaces (55) reach and snap into engagement with the lips (39).

6. A connector as claimed in claim 3, wherein the retention means comprises on at least some of the lugs (6) a radially inward projecting detent (14) having a retention surface (16) for axial retention with the filler pipe retention feature (8).

7. A connector as claimed in claim 6, wherein the inwardly projecting detents (14) have a ramp section (15) adapted to slide over a radially outwardly projecting filler pipe retention feature (8), and wherein the collar (4) may be fitted to the filler pipe (3) by relative axial movement during which the lugs (6) flex outwardly as the ramp sections (15) of the inwardly projecting detents (14) are pressed over the filler pipe retention feature (8) until the retention surfaces (16) reach and snap into retention with the filler pipe retention feature (8).

8. A connector as claimed in claim 6, wherein each lug (6) has both the inwardly (14) and the outwardly (13) projecting detents.

9. A connector as claimed in claim 3, wherein the collar (4) has four lugs (6).

10. A connector as claimed in claim 3, wherein the lugs (6) naturally tend to taper radially outwards away from the ring (5).

11. A connector as claimed in claim 3, wherein each lip (39) terminates in an edge (40) which is adapted to contact an edge (62) of the engagement surface (55) to limit axial rotation of the collar (4).

12. A connector as claimed in claim 11, wherein the edge (40) of the lip (39) and/or the edge (62) of the engagement surface (55) is/are chamfered so that upon application of a sufficient torque the collar (4) may be readily rotated with respect to the housing (2) so that the edge (62) of the engagement surface (55) rides up over the edge (40) of the lip (39) to disengage the engagement surface (55) from the lip (39), whereupon the collar (4) may be disengaged from the housing (2).

13. A connector as claimed in claim 12, wherein the collar (4) ha s a grip feature (17) t o facilitate the application of the sufficient torque.

14. A connector as claimed in claim 3, wherein the housing (2) has apertures (12) therethrough giving access to the lugs (6) and the disengagement of an engagement surface (55) from a lip (39) may be facilitated by pressing a lug (6) radially inwards through an aperture (12).

15. A connector as claimed in claim 1, wherein the sealing means comprises an annular shoulder (61) in the passage which supports a grommet (60) for making the seal with the filler pipe (3), the passage having a second annular shoulder (63) to protect the grommet (60) by preventing the lugs (6) from penetrating as far as the grommet (60).

* * * * *